(12) United States Patent
Westlund

(10) Patent No.: US 7,708,795 B2
(45) Date of Patent: May 4, 2010

(54) AIR FILTER UNIT

(75) Inventor: Lars Westlund, Trosa (SE)

(73) Assignee: Camfil AB, Trosa (SE)

( * ) Notice: Subject to any disclaimer, the term of this patent is extended or adjusted under 35 U.S.C. 154(b) by 272 days.

(21) Appl. No.: 11/718,099

(22) PCT Filed: Sep. 15, 2006

(86) PCT No.: PCT/SE2005/001350

§ 371 (c)(1),
(2), (4) Date: Apr. 27, 2007

(87) PCT Pub. No.: WO2006/046900

PCT Pub. Date: May 4, 2006

(65) Prior Publication Data

US 2008/0086995 A1   Apr. 17, 2008

(30) Foreign Application Priority Data

Oct. 27, 2004   (SE) .................................... 0402604

(51) Int. Cl.
*B01D 46/00* (2006.01)
(52) U.S. Cl. .................. 55/502; 55/498; 55/505; 55/508; 55/510; 210/497.01
(58) Field of Classification Search .............. 55/498, 55/502, 505, 508, 510; 210/493.2, 497.01
See application file for complete search history.

(56) References Cited

U.S. PATENT DOCUMENTS

| | | | |
|---|---|---|---|
| 3,985,657 A | 10/1976 | Coughlan | |
| 4,507,203 A | 3/1985 | Johnston | |
| 4,767,427 A * | 8/1988 | Barabas et al. | 55/493 |
| 5,803,941 A * | 9/1998 | Berkhoel et al. | 55/498 |
| 5,895,510 A * | 4/1999 | Butler et al. | 55/490 |

(Continued)

FOREIGN PATENT DOCUMENTS

DE   197 35 992   2/1999

(Continued)

OTHER PUBLICATIONS

Extended European Search Report, mailed Oct. 23, 2008 and issued in corresponding European Patent Application No. 05783889.8-2113.

*Primary Examiner*—Michael A Marcheschi
*Assistant Examiner*—Robert A Clemente
(74) *Attorney, Agent, or Firm*—Young & Thompson

(57) ABSTRACT

The present invention relates to an air filter unit (1) having the shape of a tube comprising a top plate (6), having an air inlet (7) leading into the interior of the tube, whereby the top plate (6) includes fasteners (13) for removably attaching said air filter unit to a wall (2) so that the air inlet of the top plate is concentrically disposed in relation to an opening in said wall, and a sealing ring (14,15) of a resilient material surrounding the air inlet in the top plate. According to the present invention, the top plate (6) includes at least one protrusion (16) on the side thereof facing said wall (2) in use, the height of said protrusion (16) being less than the distance with which the sealing ring (14,15), when not subjected to load, projects out from the surface of the top plate.

10 Claims, 3 Drawing Sheets

U.S. PATENT DOCUMENTS

| | | | | |
|---|---|---|---|---|
| 6,096,207 | A * | 8/2000 | Hoffman et al. | 210/232 |
| 6,387,162 | B1 * | 5/2002 | Kosmider et al. | 95/273 |
| 6,488,746 | B1 * | 12/2002 | Kosmider et al. | 95/273 |
| 6,568,540 | B1 | 5/2003 | Holzmann et al. | |
| 6,626,973 | B2 * | 9/2003 | Park | 55/480 |
| 7,264,656 | B2 * | 9/2007 | Kosmider et al. | 95/273 |
| 7,294,161 | B2 * | 11/2007 | Connor et al. | 55/498 |

FOREIGN PATENT DOCUMENTS

| | | |
|---|---|---|
| FR | 2 075 860 | 10/1971 |
| WO | 99/37386 | 7/1999 |

\* cited by examiner

AIR FILTER UNIT

BACKGROUND OF THE INVENTION

1. Field of the Invention

The present invention relates to an air filter unit having the shape of a tube comprising a top plate, having a planar surface distal to the interior of the air filter unit and an air inlet leading into the interior of the tube, whereby the top plate includes fasteners for removably attaching said air filter unit to a wall so that the air inlet of the top plate is concentrically disposed in relation to an opening in said wall, and a sealing ring of a resilient material surrounding the air inlet in the top plate.

2. Description of the Related Art

Air filter units of the above mentioned type have often a double-walled tube with a particulate filter material, especially gas-phase filter media, such as activated carbon, zeolite or porous impregnated aluminium, disposed in the space between walls of the tube. Several of such air filter unit are normally attached to a vertical wall with the longitudinal axis of the tube extending perpendicular to the vertical wall. The function of the sealing ring surrounding the air inlet in the top plate of the air filter unit is to seal the connection between the top plate and the vertical wall. This is done by ensuring that the sealing ring is slightly compressed by the connection of the fastener on the top plate in fastening openings in the vertical wall. When the air filter units are in use, the force of gravity of the unit creates moment forces acting on the sealing ring so that the lower side of the ring is subjected to an additional compressive force component whereas the upper side of the sealing ring is subjected to a tractive force component. This can lead to a leakage of polluted air through gaps between the upper part of the sealing ring and the vertical wall. There is also a risk for excessive wear of the sealing ring making frequent changes of used sealing rings necessary in order to ensure air tightness of the connection between the top plate and the vertical wall.

The objective of the present invention is to significantly reduce said risk for leakage and said wear of such sealing rings by eliminating the influence of the moment forces on the sealing rings.

SUMMARY OF THE INVENTION

Said objective is accomplished by an air filter unit having the shape of a tube comprising a top plate, having an air inlet leading into the interior of the tube, whereby the top plate includes fasteners for removably attaching said air filter unit to a wall so that the air inlet of the top plate is concentrically disposed in relation to an opening in said wall, and a sealing ring of a resilient material surrounding the air inlet in the top plate, characterised in that the top plate includes at least one protrusion on the side thereof facing said wall in use, the height of said protrusion being less than the distance with which the sealing ring, when not subjected to load, projects out from the planar surface of the top plate. When the air filter unit is in use the at least one protrusion will take up the load due to the force of gravity of the air filter unit and such a load will not influence the sealing ring. Thereby the risk for leakage has been reduced to a high extent and the sealing ring will not wear as fast as before and there will be no need for frequent changes of sealing rings worn out.

In a preferred embodiment the at least one protrusion is a ridge projecting out from the periphery of the top plate.

In an alternative, the at least one protrusion can be three protrusions evenly distributed around the periphery of the top plate.

In both alternatives, wherein two sealing rings can concentrically surround the air inlet in the top plate, and each sealing ring can be accommodated in a groove in the top plate. The fasteners can preferably be the protruding parts of a bayonet fixing adapted to fit in bayonet openings in said wall.

Advantageously, the top plate is made of plastic material.

BRIEF DESCRIPTION OF THE DRAWINGS

The invention will now be described with reference to the enclosed drawings, of which, FIG. 1 schematically discloses a side view of air filter units according to an embodiment of the invention attached to a vertical wall, FIG. 2 schematically illustrates the influence of gravity on a known air filter unit, FIG. 3 schematically discloses a perspective view of an air filter unit according to a preferred embodiment of the invention, FIG. 4 discloses a plan view of a top plate being part of the air filter unit of FIG. 3, FIG. 5 discloses a sectional view along line V-V in FIG. 4, and FIG. 6 discloses a portion of FIG. 5 in an enlarged scale.

DETAILED DESCRIPTION OF THE INVENTION

Figure 1:
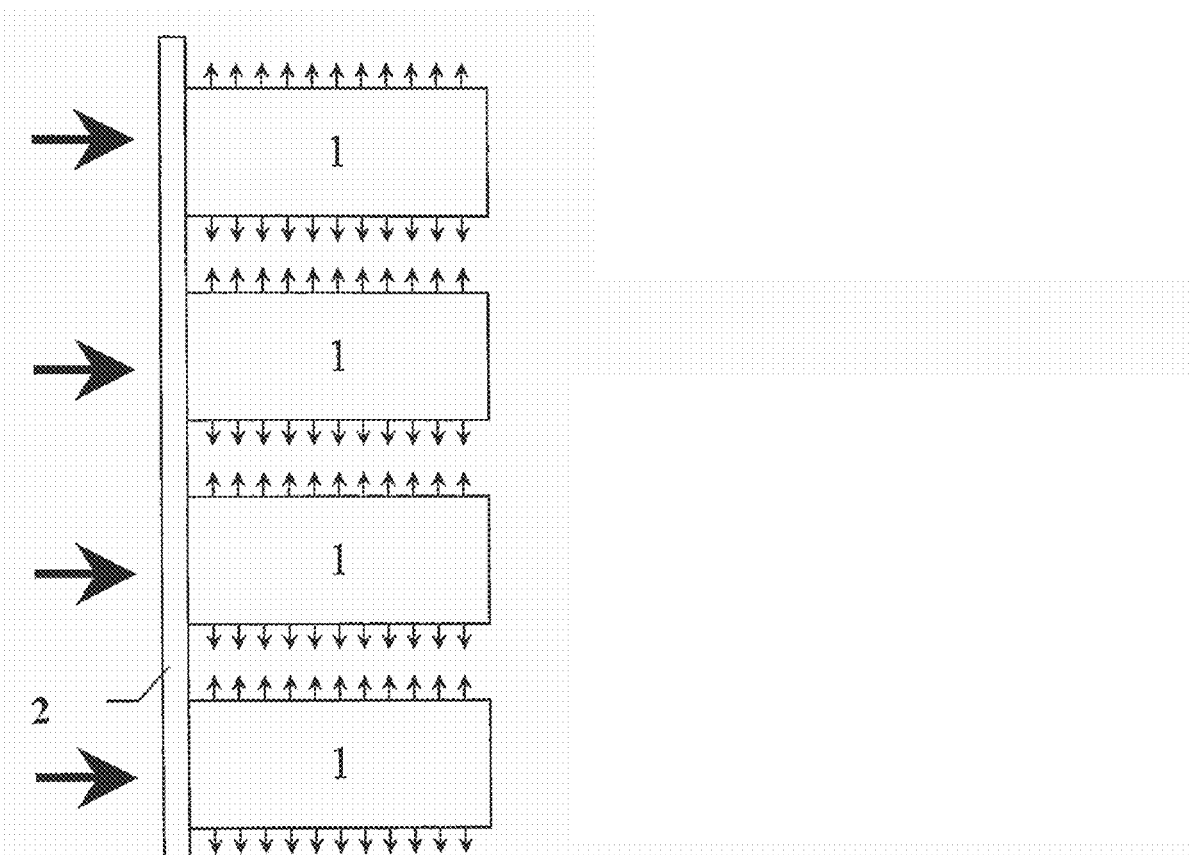

Air filter units 1 according to an embodiment of the present invention are usually arranged in several rows on a vertical wall 2, one such row of air filter units 1 being schematically shown in FIG. 1. The tubular walls of the units 1 are air permeable so that air axially flowing into the interior of units 1 through an axial inlet via openings in the wall 2 concentric to said inlets will leave the units in an axial flow as indicated by arrows in FIG. 1.

Figure 2:
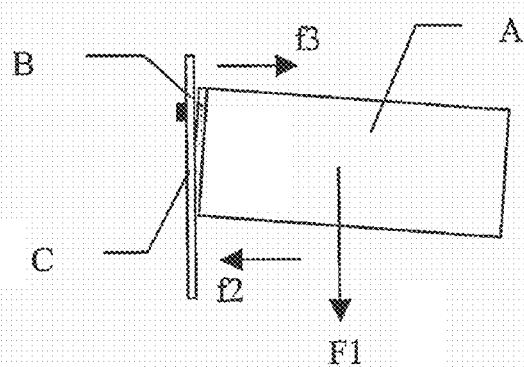
Figure 3:
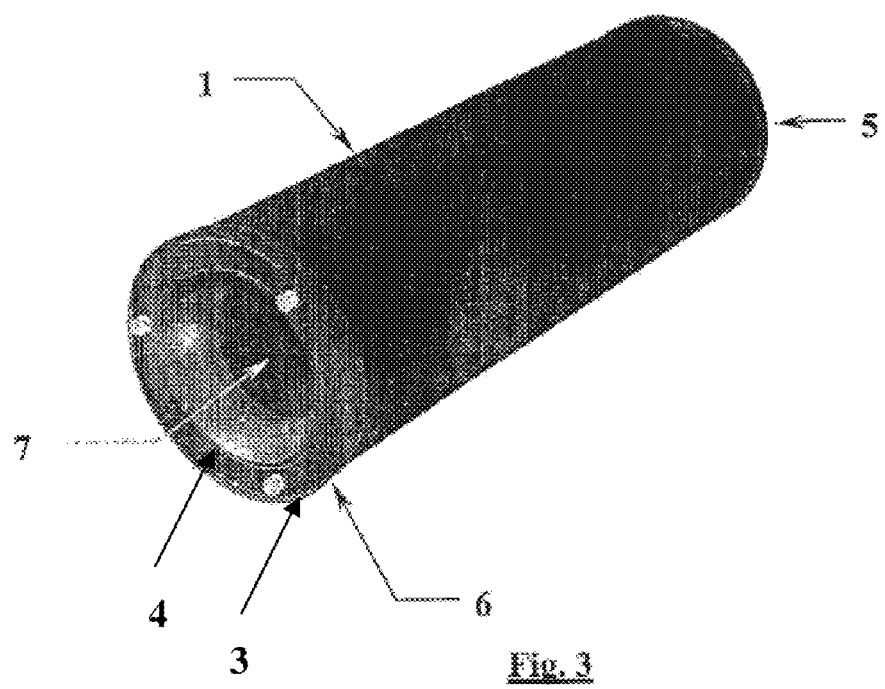

In FIG. 2 an air filter unit A according to prior art including a sealing ring B disposed between the unit A and a vertical wall C is schematically shown with a very schematic illustration of the force components acting on the sealing ring B due to the force of gravity F1. The force of gravity F1 causes a moment force on the end side of the unit A attached to the wall C by suitable fastening means, such as a bayonet joint. Thereby the lower portion of the sealing ring B will be subjected to compressive force components, schematically illustrated by arrow $f_2$, and the upper portion will be subjected to tractive force components, schematically illustrated by arrow $f_3$. If the sealing ring is of to soft material there is a risk that a gap will form in the upper portion between the ring and the wall C and leakage of air will occur. Moreover, there is an uneven load distribution acting on the sealing ring with the consequence that this ring will wear out faster than if the force components acting on the sealing ring due to the force of gravity F1 could be eliminated. Another disadvantage is that the ring must be chosen so that it can withstand said compressive force components which reduces the possible choices of sealing material in comparison with a case when the force components due to force of gravity can be eliminated. By the air filter units according to the present invention the influence of the force of gravity of the air filter unit on the sealing rings is eliminated or at least greatly reduced.

In FIGS. 3-6 a preferred embodiment of the air filter unit 1 according to the present invention is showed more in detail.

The air filter unit 1 is composed of two concentric cylindrical tubes 3 and 4, respectively held together by a bottom plate 5 and a top plate 6. The walls of the cylinders 3,4 are air permeable and the space between these walls is filled with a particulate gas-phase filter media, preferably activated carbon. The top plate comprises an air inlet 7 leading into the interior of the innermost tube 4. Air to be filtered will thus flow axially into the air filter unit and pass out of the unit radially through the walls of tubes and through the filtering material between the walls of the tubes 3,4, as indicated by arrows in FIG. 1.

Figure 4:
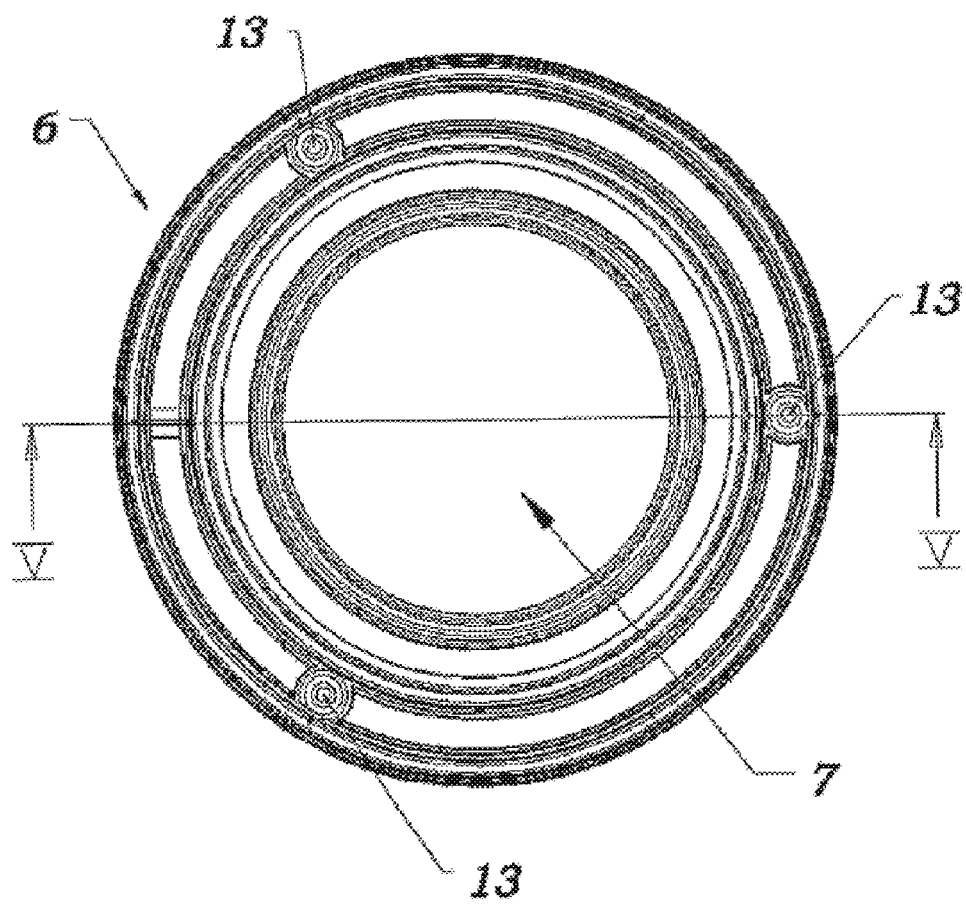
Figure 5:
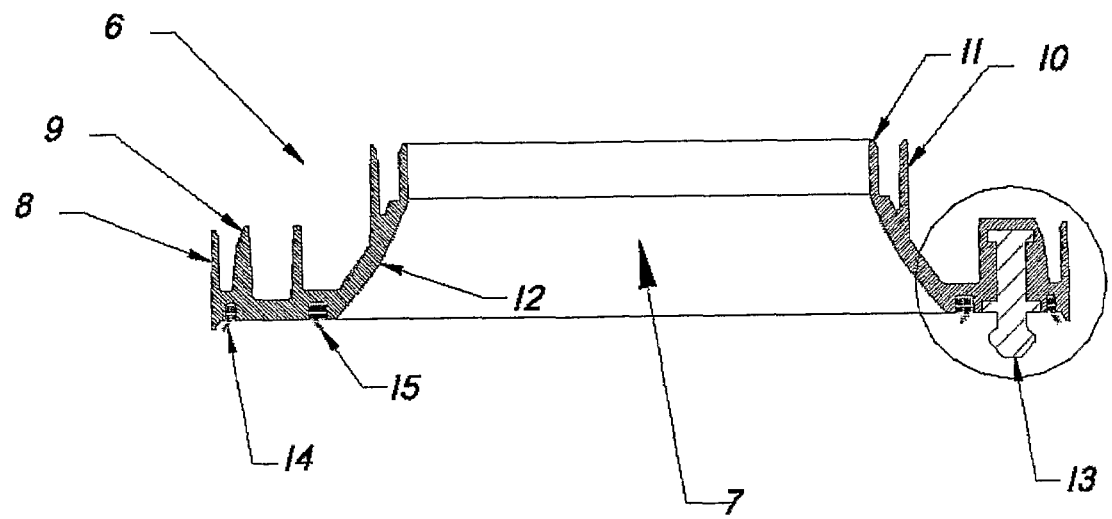
Figure 6:
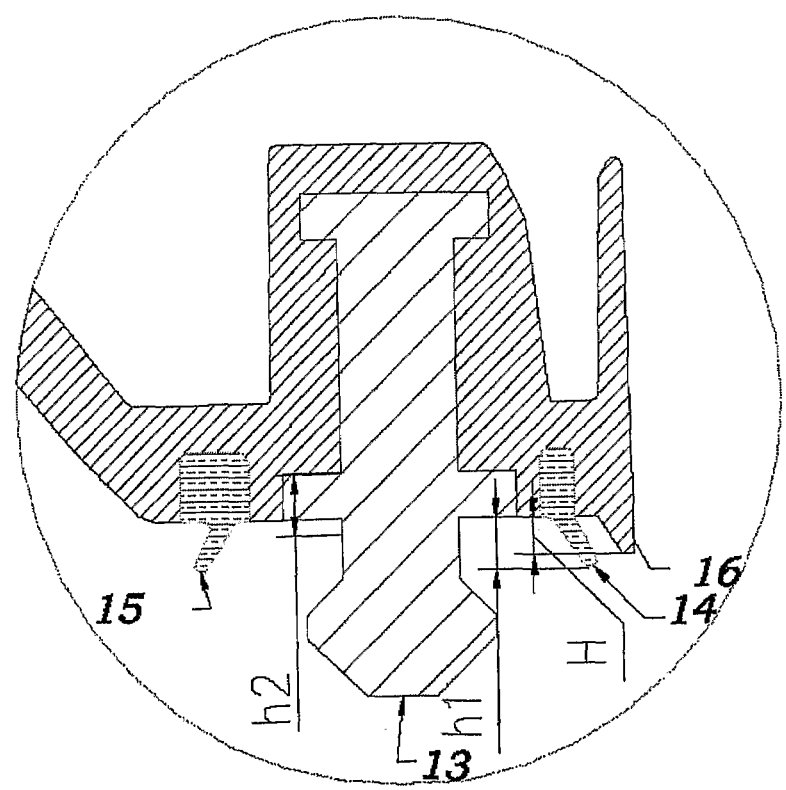

In FIGS. 4-6 the top plate 6 is shown in more detail. On the side thereof facing the tubes 3,4, the top plate comprise two pairs of flanges 8,9 and 10,11 respectively, between which the ends of the walls of the tubes 3,4 are to be inserted and to which these ends are affixed by any suitable means, such as by gluing or welding. As can be seen in FIG. 5, the air inlet 7 of the top plate is constituted by a wall part 12 extending in a direction towards the bottom plate 5 and tapering in this direction, the second pair of flanges 10,11 being disposed in the end of the tapering wall part 12. The second pair of flanges is thus disposed closer to the bottom plate 5 than the first pair of flanges 8,9. The inner tube 4 is therefore shorter than the outer tube 3.

Furthermore, the top plate 6 comprises three male elements 13 of a bayonet joint, said element being evenly disposed along the air inlet 7. The heads of these male elements fit into the large part of key-hole shaped openings in the vertical wall 2 and the air filter unit is mounted by placing the heads of elements 13 into the large part of the key-hole shaped openings and then turning the air filter unit so that the stems of elements 13 will be disposed in the narrow portions of said openings in the vertical wall. The elements 13 can be integral parts of the top plate or separate elements affixed therein. In the embodiment shown the elements 13 are made of stainless steel or reinforced plastic material and arranged in the mould for moulding of the top plate 6 so as to form part of this mould when moulding the top plate.

The top plate 6 also includes two sealing rings 14,15, ring 14 being disposed radially outside of elements 13 and ring 15 radially inside of elements 13. The sealing rings 14,15 are seated in grooves in the top plate 6.

According to the present invention, the top plate 6 further includes a protrusion projecting from the side thereof facing the vertical wall 2 in use of the air filter unit 1. In the embodiment shown this protrusion is constituted by a peripheral ridge 16 extending around the periphery of the top plate. This ridge 16 has a height H, i.e. the dimension in the axial direction of the air filter unit 1, which is less than the height h1 of the sealing rings 14,15 when uncompressed, i.e. when the rings are not subjected to any load. The height h2 of the stem of the male element 13 is larger than the height H of the ridge 16 and should be such as the difference between the height h2 of the stem and the height H of the ridge 16 corresponds to the thickness of the vertical wall 2.

The air filter unit 1 is affixed to the vertical wall 2 by inserting the heads of elements 13 into the larger portions of the key-hole shaped openings in the vertical wall and by turning the air filter unit such as the stems of elements 13 are passed into the narrow portions of the key-hole shaped openings. Thereby the sealing rings will be compressed and the ridge 16 will come to abut the side of the vertical wall. By the shown construction of the sealing rings 14,15, the compression force will bend the inclined lip-shaped portions of the sealing rings 14,15 a distance corresponding to the difference between the height h1 and H in FIG. 6. The resiliency of the sealing rings 14,15 will make the lip-shaped portions thereof to tightly seal against the vertical wall.

By such a construction, the compressive forces due to force of gravity of the air filter unit will be taken up by the ridge 16 and will not influence the sealing rings 14,15. Another advantage is that the distance with which the sealing rings will be compressed due to the fastening of the air filter unit to the vertical wall is determined by the difference h1-H and this distance can thus be chosen in accordance with the properties of the sealing ring material so that an appropriate tightening force of the sealing rings against the surface of the vertical wall can be easily obtained. This enables the use of a greater variety of materials for the sealing rings than in the air filter units according to prior art.

In the described embodiment the protrusion is continuous and extends along the whole periphery of the top plate. This is preferred but not necessary. The protrusion can be discontinuous and consists of several small segments, for example three segments evenly distributed around the periphery of the top plate. In such a case it is preferred that one of these segments will be disposed under the centre of the top plate when the air filter unit is fastened to the vertical wall, i.e. on a vertical line passing through the centre of the top plate. Moreover, the protrusion need not be disposed at the outer edge of the top plate but can be disposed anywhere on the planar surface of the top plate between the inlet opening and the outer edge thereof.

The top plate 6 and the bottom plate 5 are preferably made of moulded plastic material, for example ABS (Acrylonitrile-Butadiene-Styrene) plastic material, but other plastic material such as polypropylene, polycarbonate, polystyrene, polyamides, etc, can also be used. It is also possible to make the top and bottom plates of sheet metal.

The tubes 3,4 are preferably made of perforated metal or plastic sheets, the holes or pores thereof being smaller than the particulate filtering material disposed in the space between the tubes.

The described embodiment can of course be modified in several aspects without leaving the scope of invention. For example, the cross-section of the air filter unit need not be circular but can have another shape, such a oval, rectangular or square. Furthermore, it is enough to have one sealing ring instead of two sealing rings as in the described embodiment and other types of sealing rings, for example O-rings, can be used instead of rings 14,15. The sealing rings need not be disposed in seats in the top plate, although this is preferred for the type of sealing rings used in the described embodiment, but can for example be loose rings that can threaded over the three male fastener elements and prevented from falling off the top plate by the heads thereof. Furthermore, the two sealing rings can have different heights, whereby the inner sealing ring preferably is the higher one. The scope of invention shall therefore only be limited of the scope of the enclosed patent claims.

The invention claimed is:

1. An air filter unit having a shape of a tube, comprising:
a top plate having an air inlet leading into an interior of the tube;
two concentric cylindrical, air permeable tubes; and
a bottom plate,
wherein a space between the two concentric tubes is filled with filter media, and a sealing ring of a resilient material is surrounding the air inlet in the top plate, the top plate includes at least one protrusion on a side thereof facing a wall in use, a height of said protrusion being less than a distance with which the sealing ring, when not subjected to load, projects out from a surface of the top plate, and the top plate includes fasteners for removably attaching said air filter unit to the wall so that the air inlet of the top plate is concentrically disposed in relation to an opening in said wall and so that said at least one protrusion abuts said wall when the air filter unit is attached thereto, and in that an inner tube of the two tubes is shorter than an outer tube of the two tubes.

2. The air filter unit according to claim 1, wherein the at least one protrusion is a ridge projecting out from a periphery of the top plate.

3. The air filter unit according to claim 1, wherein the at least one protrusion are three protrusions evenly distributed around a periphery of the top plate.

4. The air filter unit according to claim 1, wherein two sealing rings concentrically surround the air inlet in the top plate.

5. The air filter unit according to claim 1, wherein each sealing ring is accommodated in a groove in the top plate.

6. The air filter unit according to claim 1, wherein the fasteners are protruding parts of a bayonet fixing adapted to fit in bayonet openings in said wall.

7. The air filter unit according to claim 1, wherein the top plate is made of plastic material.

8. The air filter unit according to claim 6, wherein the plastic material is acrylonitrile-butadiene-styrene, polypropylene, polycarbonate, polystyrene or polyamide.

9. The air filter unit according to claim 1, wherein the filter media is activated carbon.

10. An air filter unit having a shape of a tube, comprising:
a top plate having an air inlet leading into an interior of the tube, the top plate including at least one protrusion on a side thereof facing a wall in use;
two concentric cylindrical, air permeable tubes, the tubes being an outer tube and an inner tube that is shorter than the outer tube;
filter media filling a space between the two concentric tubes; and
a bottom plate; and
a sealing ring or o-ring of a resilient material that surrounds the air inlet in the top plate,
wherein a height of said protrusion is less than a distance with which the sealing ring or o-ring, when not subjected to load, projects out from a surface of the top plate, and the top plate includes fasteners for removably attaching said air filter unit to the wall so that the air inlet of the top plate is concentrically disposed in relation to an opening in said wall and so that said at least one protrusion abuts said wall when the air filter unit is attached thereto.

* * * * *